Jan. 8, 1929.

A. M. HAHN ET AL 1,697,865

REGULATING VALVE FOR PRESSURE CONTROL OF HOT WATER HEATING SYSTEMS

Filed Oct. 29, 1927

2 Sheets-Sheet 1

INVENTORS.

BY

ATTORNEY.

Jan. 8, 1929. 1,697,865
A. M. HAHN ET AL
REGULATING VALVE FOR PRESSURE CONTROL OF HOT WATER HEATING SYSTEMS
Filed Oct. 29, 1927 2 Sheets-Sheet 2
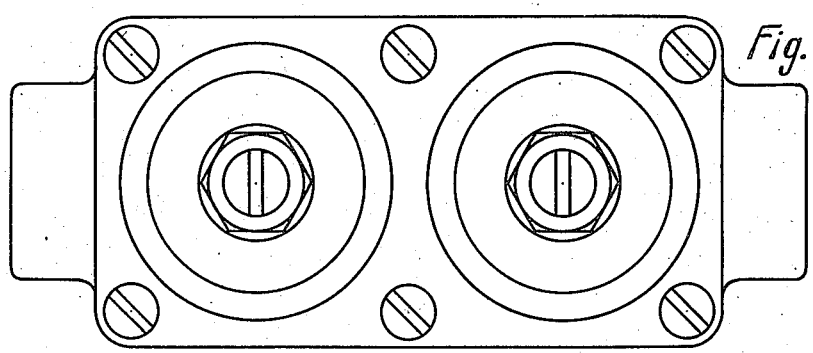
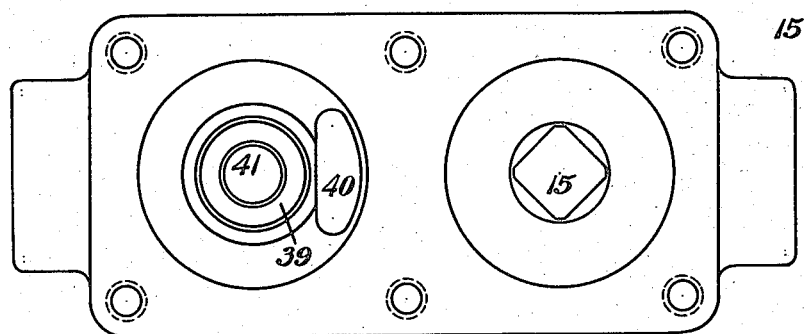
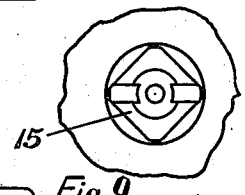
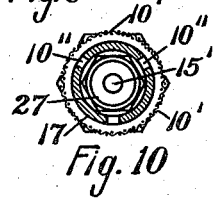
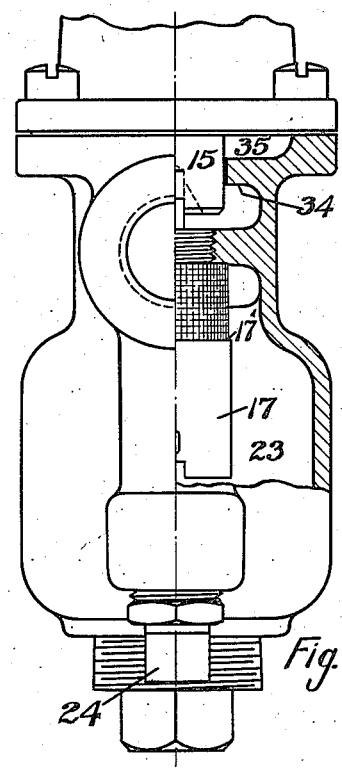
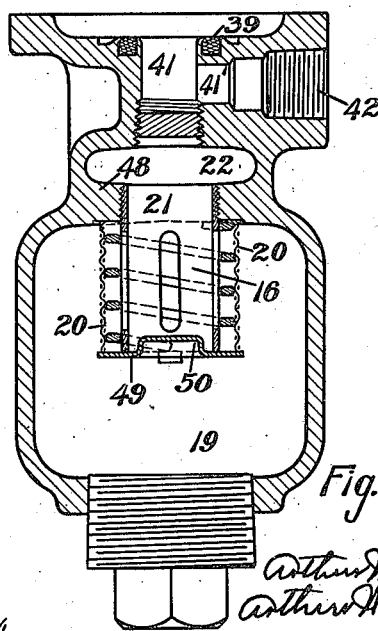
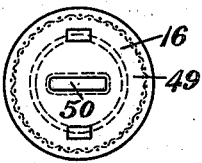
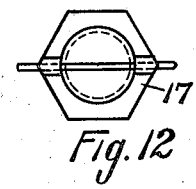

Patented Jan. 8, 1929.

1,697,865

UNITED STATES PATENT OFFICE.

ARTHUR M. HAHN AND ARTHUR W. CASH, OF DECATUR, ILLINOIS, ASSIGNORS TO A. W. CASH VALVE MFG. CORPN., OF DECATUR, ILLINOIS.

REGULATING VALVE FOR PRESSURE CONTROL OF HOT-WATER HEATING SYSTEMS.

Application filed October 29, 1927. Serial No. 229,777.

The object of this invention is, first, to provide a dependable pressure reducing and regulating valve that will maintain a constant predetermined initial pressure of cold water in the heating boiler, and piping thereon; second, to provide a dependable relief valve adapted to relieve excessive pressure due to expansion from heating of the water within the boiler above a predetermined amount; third, to provide a manually operated by pass valve whereby the boiler and piping system may be initially quickly filled with water, thus avoiding slow tedious filling through the reducing and regulating valve seat which it is desirable to provide in much smaller size and capacity than that of the by pass valve to better meet normal requirements of very greatly reduced water flow after the boiler and system has once been filled, as will hereinafter be explained. A fourth object, is to provide primary and secondary sediment chambers having a strainer of suitable size mesh in the primary chamber to intercept and retain a major portion of scale, cuttings, grit, and other foreign substances which are quite generally present in water supply pipes, said strainer however not having a sufficiently fine mesh to become gummed and entirely clogged by the much finer foreign matter including pipe joint compounds also commonly present in water supply pipes. The secondary sediment chamber is provided with a strainer of finer mesh which will more thoroughly protect the small pressure reducing and regulating valve seat which must necessarily open only a very slight amount under normal service conditions. This finer mesh screen will not readily become gummed and clogged due to the fact that only a comparatively very small quantity of water will be required to pass through the reducing and regulating valve, consequently whatever foreign matter which may have passed thru the coarser mesh screen in the primary sediment chamber will have ample opportunity to become deposited in the secondary sediment chamber where flow current will be insufficient to cause any considerable agitation.

Figure 1:
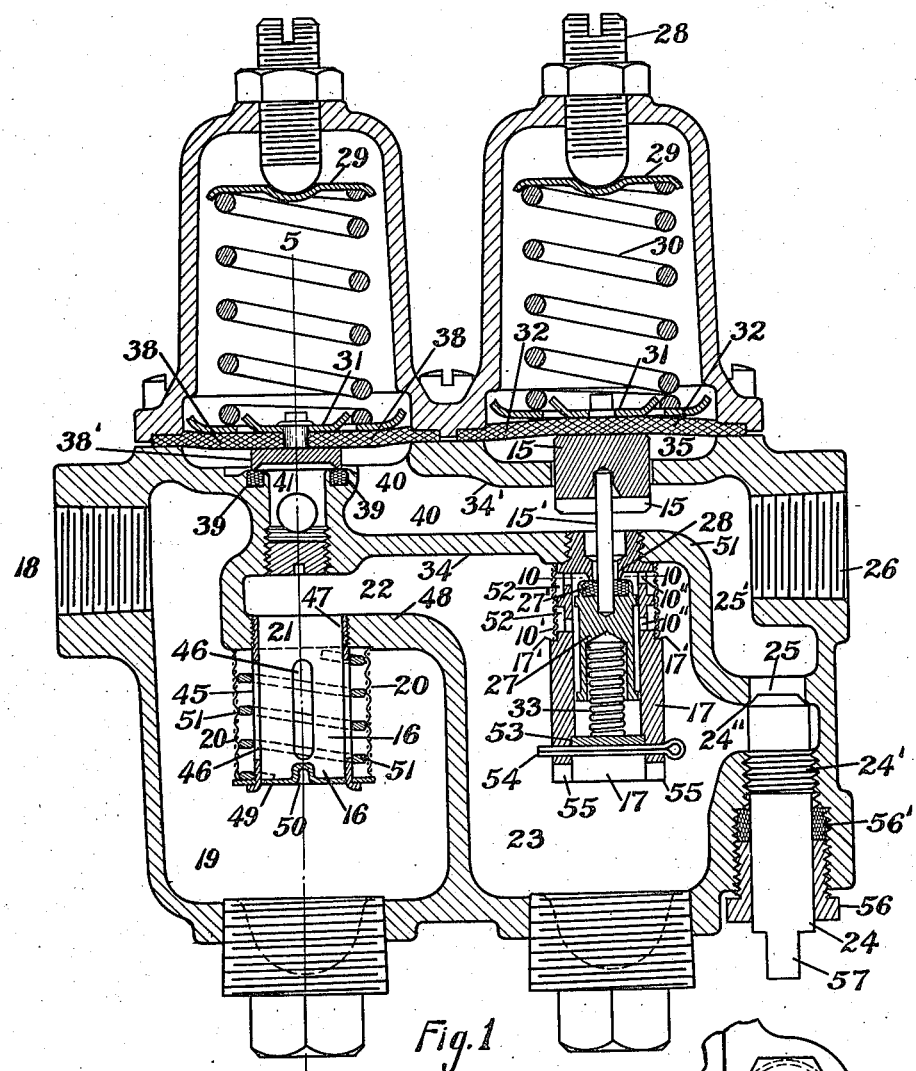
Figure 6:
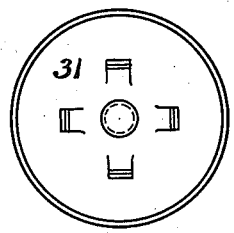
Figure 7:
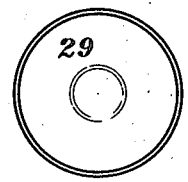
Figure 8:
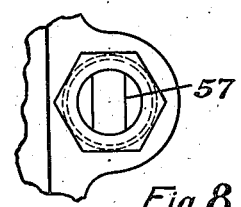

How the several objects stated are attained, will now be explained, reference being had to the drawings in which Figure 1 is a front elevation in section; Figure 2 is a plan view looking from above; Figure 3 is a top view with spring chamber and its inside part removed; Figure 4 is an end elevation looking from the right hand side, with upper portion of spring chamber broken away and upper part of main body portion in section; Figure 5 is a sectional end elevation of body portion on line 5—5 of Figure 1 more particularly illustrating a section through the discharge connection from the relief valve. Figure 6 and Figure 7 are plan views respectively of lower spring pressure plates and upper spring caps as will be commonly used within the spring chambers of both the pressure reducing and regulating valve and in the relief valve portions of what we will hereinafter refer to as a combined control. Figure 8 is a bottom view of operating stem and packing box nut of the manually operated by pass valve together with fragmental section of that portion of the body casing. Figure 9 is a bottom view of pusher post cap 15, as shown in Figure 1 and Figure 4, with a fragmental portion of surrounding body wall. Figure 10 is a sectional view on line 10—10 of Figure 1. Figure 11 is a bottom view of primary strainer 16 as shown in Figure 1 and Figure 5. Figure 12 is a bottom view of reducing and regulating valve seat cylinder portion 17 as shown in sectional elevation in Figure 1 and partial elevation in Figure 4.

Reference numerals refer to corresponding parts throughout the several drawings.

The operation of our improved pressure control is as follows.

Referring to Figure 1, water entering at pipe connection 18 flows downward into primary sediment chamber 19, where a greater portion of the foreign substances will be deposited, thence the flow is thru the meshes of strainer screen 20 upward through port 21 and passage way 22 into secondary sediment chamber 23.

If now the manually operated by pass valve 24, which is screw threaded at 24' is turned anticlockwise and downward the seat at 24″ will be opened and water will flow thru orifice 25, up thru passageway 25′ and out thru pipe threaded connection at 26 until the heater and piping system has been filled to the desired pressure, after which by pass valve 24 is closed.

Automatic operation of the pressure reducing and regulating valve 27 to maintain a predetermined minimum pressure in the heater and system when the water is cold, is effected in the following manner. Pressure adjusting screw 28 is turned downward and acts through spring cap 29 to compress spring 30 which through pressure plate 31, loads diaphragm 32 against the required predetermined pressure on its under side.

Flexible diaphragm 32 rests against upper surface of pusher post cap 15 which in turn is pressed downward on pusher post 15′ whose lower end is preferably fixedly connected to regulating valve 27 which carries seat disc 27″ adapted to imperviously close against raised seat 28 in upper portion of seat cylinder 17, which is normally held in upward and closed position by the combined action of seat spring 33 and the upward pressure of water against lower end of hexagonal valve 27, guided on its corners within seat cylinder 17, as shown in Figure 10, the water having first passed through screen 10′ and ports 10″.

Pusher post cap 15 is square in section and is guided by its four corners within a cylindrical aperture through dividing wall 34′ as shown at Figure 9, permitting water from the heater to enter and fill chamber 35 thereby forcing diaphragm 32 upward until the seat opening at 28 is closed.

As soon as the normal predetermined cold water pressure in the heater has been reduced from any cause, the stored power of compression in spring 30 will force diaphragm 32 and valve 27 downward, open seat 28 and permit flow of water into the system until normal pressure is again restored.

After the system has been filled with cold water to normal predetermined pressure, and fire built in the heater furnace, the temperature of the water in the system will be raised together with a corresponding increase in pressure, and as soon as the increased pressure has reached the predetermined maximum point for which relief diaphragm 38 and valve 38′ have been loaded, valve 38′ will be lifted away from its seat disc 39, and permit flow of the excess pressure from the system back through passageway 40, past seat 38′ down through orifice 41 and port 41′ to outlet threaded connection at 42 to waste drain.

The loading means on relief diaphragm 38′, it will be seen, is the same as shown and described for regulating diaphragm 32.

As primary strainer 20 and secondary strainer 10′ are not considered a part of our invention they will be briefly described as follows. Primary strainer 20 comprises a tubular body portion 45 screw threaded at its upper end 47 for engagement in partition wall 48 and having its lower end closed by cap 49, having screw driver slot 50, adapted to fasten body into partition wall 48. Metallic strip 51 is wound in helical form about tubular body 45 to provide clearance space between screen 20 and body portion 45 to permit free passage of fluid around and through slots 46 therein.

Valve cylinder 17 which is hexagonal in outer form, is screw threaded at its upper end for impervious engagement with partition wall 34 and just below this threaded portion cylinder 17 is made round in outer form down to shoulders 17′ for reception and holding of screen 10′. Annular grooves 52—52 are provided to permit free passage of water through screen 10′ and ports 10″.

Seat piston spring 33 is held in compression by means of bottom plate 53 and cotter pin 54 while screw driver slots 55—55 provide means for placement or removal of seat cylinder 17.

Manually operated by pass valve 24 is provided with packing nut 56, and suitable packing material 56′ to prevent leakage, while the lower end 57 is flattened on two sides as shown in Figure 8 for reception of a wrench as means for operation.

Having shown and described the construction and operation of our improvement in regulating valves for pressure control of hot water heating systems, we claim:

1. In a regulating valve for pressure control of a hot water heating system, the combination of a primary strainer and sediment chamber, a secondary strainer and sediment chamber, said secondary strainer having finer mesh than said primary strainer, an automatic diaphragm controlled water pressure reducing and regulating valve having a small diameter and capacity of seat opening adapted to supply only the normally small volume of water required for replacement due to evaporation and wastage from relief of excess pressure, a manually operated by pass valve protected by said primary strainer, and having larger seat opening than the reducing and regulating valve and capacity adapted for quick initial filling of the heater and its piping system, together with a diaphragm operated relief valve having adjustable loading means, whereby any excess pressure in the heating system above a predetermined amount will be automatically relieved.

2. In a regulating valve for automatic pressure control of a hot water heating system, the combination within one body casing, of a primary strainer and sediment chamber, a secondary finer strainer and sediment chamber, an automatic diaphragm operated pressure reducing and regulating valve protected by said secondary strainer, a manually operated by pass valve having comparatively greater size and capacity of seat opening than said pressure reducing and regulating valve, said by pass valve being adapted for the initial quick filling of the heater and its connected piping system, together with a diaphragm operated relief valve adapted to automatically relieve any excess pressure above a predetermined amount within the heating system.

ARTHUR M. HAHN.
ARTHUR W. CASH.